US 6,561,051 B2

(12) United States Patent
Miyazaki et al.

(10) Patent No.: US 6,561,051 B2
(45) Date of Patent: May 13, 2003

(54) GEAR SHIFTING CONTROL DEVICE FOR SYNCHROMESH TRANSMISSION

(75) Inventors: Takeshige Miyazaki, Anjo (JP); Ryuji Choshi, Aichi-ken (JP); Yoshiyuki Aoyama, Nishio (JP); Mitsutoshi Kamiya, Kariya (JP); Yoshihiro Ichikawa, Gifu (JP)

(73) Assignee: Aisin Ai Co., Ltd., Nishio (JP)

( * ) Notice: Subject to any disclaimer, the term of this patent is extended or adjusted under 35 U.S.C. 154(b) by 0 days.

(21) Appl. No.: 09/940,436

(22) Filed: Aug. 29, 2001

(65) Prior Publication Data

US 2002/0023511 A1 Feb. 28, 2002

(30) Foreign Application Priority Data

Aug. 31, 2000 (JP) .......................................... 2000-263716

(51) Int. Cl.$^7$ .......................... F16H 59/00; F16H 61/00; F16H 63/00
(52) U.S. Cl. .......................... 74/336 R; 74/335; 477/97
(58) Field of Search ................................ 74/335, 336 R, 74/DIG. 7; 477/70, 86, 97, 174, 180, 906; 701/62

(56) References Cited

U.S. PATENT DOCUMENTS

| | | | | | |
|---|---|---|---|---|---|
| 5,099,711 A | * | 3/1992 | Langbo et al. | ................. | 74/335 |
| 5,389,053 A | * | 2/1995 | Steeby et al. | ................. | 477/123 |
| 5,408,895 A | * | 4/1995 | Chan et al. | .................... | 477/97 |
| 5,416,698 A | * | 5/1995 | Hutchison | .................... | 192/3.3 |
| 5,729,454 A | * | 3/1998 | Amsallen | .................... | 477/109 |

* cited by examiner

Primary Examiner—Sherry Estremsky
Assistant Examiner—Tisha D. Lewis
(74) Attorney, Agent, or Firm—Burns, Doane, Swecker & Mathis, LLP (57) ABSTRACT

A gear shifting control device for synchromesh transmission judges whether a gear clash is generated during gear shifting based on gear shifting progress information. If gear clashes occur more frequently than a reference value during a particular shifting mode, then the control device may thereafter skip that shifting mode, if certain conditions are met. The vehicle operator is warned of this event.

17 Claims, 4 Drawing Sheets

GEAR SHIFTING CONTROL DEVICE FOR SYNCHROMESH TRANSMISSION

This application is based on and claims priority under 35 U.S.C. §119 with respect to Japanese Application No. 2000-263716 filed on Aug. 31, 2000, the entire content of which is incorporated herein by reference.

FIELD OF THE INVENTION

The present invention generally relates to a gear shifting method and control device for a synchromesh transmission. More particularly, the present invention pertains to a gear shifting control device for judging whether gear clashes are generated during a gear shifting of the synchromesh transmission by an actuator.

BACKGROUND OF THE INVENTION

Vehicles such as automobiles, buses, trucks driven by engines or motors are provided with transmissions in order to obtain driving force and speed in accordance with driving conditions. Generally, there are transmissions including automatic transmissions (AT), CVT (continuously variable transmission), and manual transmissions (MT).

Manual transmissions include a counter shaft serving as an input shaft, a main shaft serving as an output shaft, a plurality of counter gears, a plurality of idling gears, a sleeve, and a synchromesh mechanism. The counter shaft transmits an input torque of an engine. The main shaft transmits an output torque to a propeller shaft. The plurality of counter gears are fixed on the counter shaft. The plurality of idling gears are idly disposed on the main shaft and are always intermeshed with the counter gears respectively. The sleeve is splined with an outer periphery of a hub unitary rotating with the main shaft and is slidable in the axial direction of the output shaft. The synchromesh mechanism selectively slides the sleeve based on the intentions of a driver and achieves a desired gear shift by synchronizing a rotation of the main shaft and a desired rotation of the idling gears in splined engagement.

In the conventional MT, a clutch operation and a shift operation must be conducted by the driver during a gear shift change. The shift operation has been operated by moving a floor (column) shift lever to a desired position shift. The movement of the shift lever is transmitted to a shift fork disposed on a tip end side of a shift fork shaft and engaged with the sleeve, and thus to slide the sleeve. Input torque and output torque are synchronized by the sliding of the sleeve in the synchromesh mechanism and thus the desired gear shift is achieved.

In recent years, there has been developed a transmission having a manual transmission structure as a base, wherein the shift operation thereof is conducted by an actuator having hydraulic pressure, air pressure, or electric power as a driving power source in order to reduce operational responsibility of the driver.

Hereinafter, the transmission of this kind will be called an automatic manual transmission. The automatic manual transmission achieves: a complete automatic shift change in accordance with the driving condition by controlling the actuator with a gear shifting control device, or a semiautomatic shift change based on the driver's intention by manually operating a synchromesh transmission.

As in a conventional manual transmission, the automatic manual transmission of this kind may generate gear clash. One of the causes of the gear clash is that the shift change is effected before synchronization is achieved, due to secular deterioration such as abrasion of the chamfer of the synchromesh mechanism, since this kind of automatic manual transmission shares the structure of the conventional manual transmission. The generation of the gear clash leads to early abrasion of spline and chamfer portions such as a sleeve and a synchronizer ring, which is not favorable from the standpoint of durability.

According to a known gear shifting control device of the automatic manual transmission, the displacement and the speed of the sleeve are controlled so that the shift change is not effected before the achievement of the synchronization. Hence, the generation of gear clash has not been considered in designing.

Figure 3A:
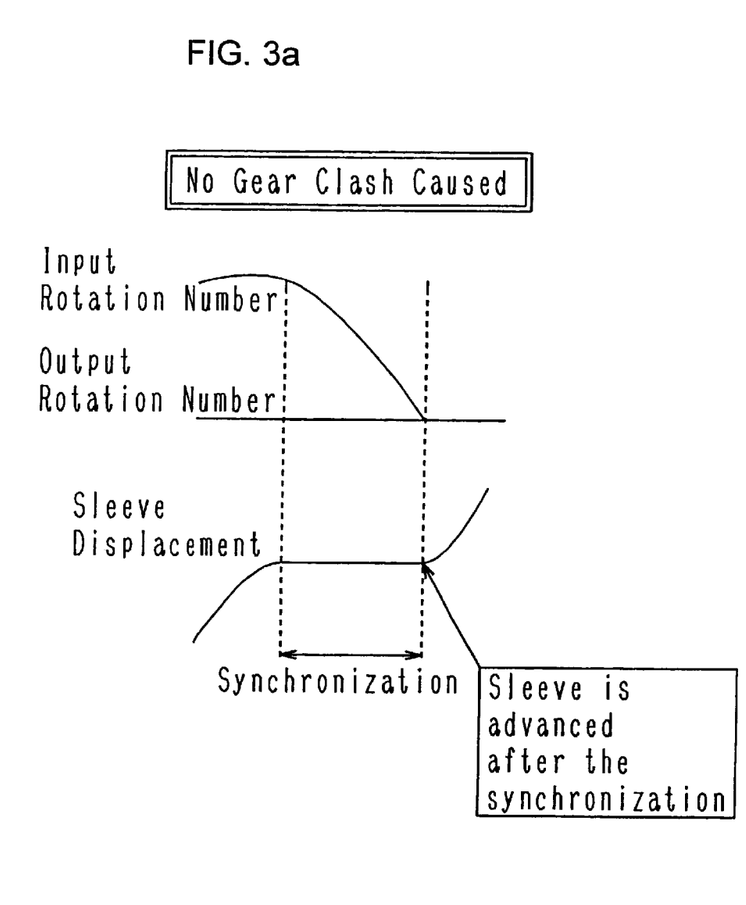
FIG. 3(a) shows a case in which the gear clash is not generated and FIG. 3(b) shows a case in which the gear clash is generated.
Figure 3B:
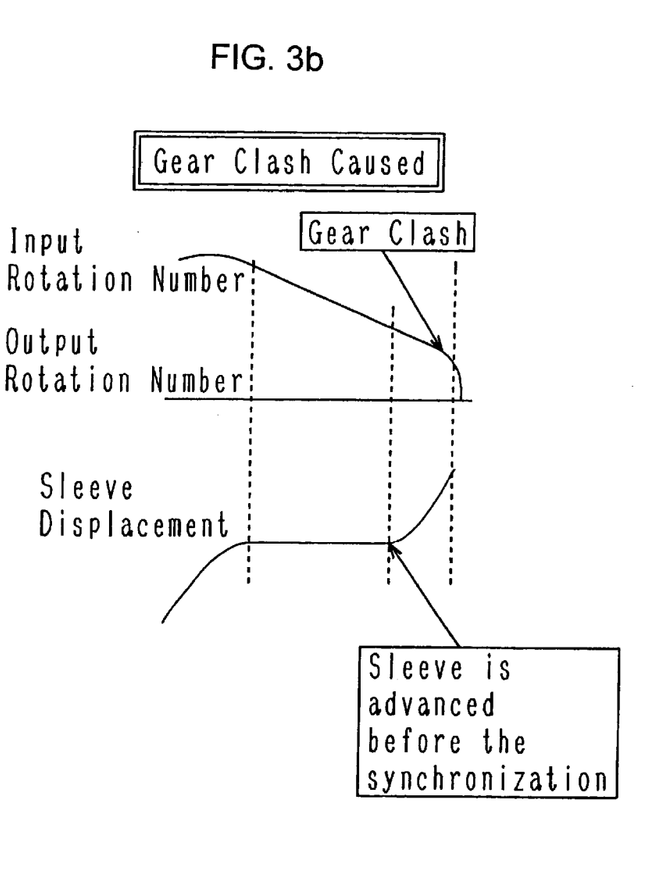

Shown in FIG. 3($a$) is a case where the sleeve does not slide during the synchronization of input and output rotation speeds, and the stroke of the sleeve starts advancing only after the rotational speeds of the input rotation and the output rotation coincide, that is, after the synchronization is completed during a normal shift change in which gear clash is not generated. On the other hand, shown in FIG. 3($b$) is a case where the stroke of the sleeve advances despite a lack of complete synchronization, so relative rotation between the input rotation and the output rotation still remains and gear clash is generated. By advancing the sleeve before completion of the synchronization, a clash between a chamfer of the spline provided on the idling gear and a chamfer of the sleeve is generated, and thus the gear clash is presumed to be generated.

In the forgoing explanation, it is mentioned that after synchronization, the input and output rotation speeds coincide. That is because the rotation speed of the input side and the rotation speed of the output side of the synchromesh mechanism are relatively considered.

Accordingly, needless to say, the rotation speeds of the input side and the output side do not agree with each other even after the completion of the synchronization unless converting the values using a deceleration ratio when the input rotation speed and the output rotation speed are measured separately.

In case the driver conducts the shift operation like a conventional manual transmission, the shift change can be manually achieved by avoiding the type of gear shift which causes gear clash. However, concerning the automatic manual transmission, the shift change is automatically performed to repeatedly select the gear shift despite the generation of gear clash unless countermeasures for preventing gear clash are provided. Thus, the durability of the automatic manual transmission is diminished by the gear clash, and the driver is given an unpleasant feeling.

A need thus exists for an improved gear shifting control device for a synchromesh transmission in which a shift change is performed by an actuator that judges whether a gear clash is generated during shift change.

SUMMARY OF THE INVENTION

In light of the foregoing, the present invention provides a gear shifting method and control device for a synchromesh transmission which includes a synchromesh mechanism having a sleeve for achieving a predetermined gear shifting by synchronization between an input shaft and an output shaft of the synchromesh transmission, an actuator for moving the sleeve, and a gear clash judging means for judging whether a gear clash is generated in the synchromesh mechanism based on gear shifting progress information for indicating the state of progress of the gear shifting.

If it is determined that gear clashes occur more frequently during a particular shifting mode (e.g. first gear, or second gear, etc.), than a reference value, then that mode can be thereafter skipped, to avoid wear.

BRIEF DESCRIPTION OF THE DRAWING FIGURES

The foregoing and additional features and characteristics of the present invention become more apparent from the following detailed description considered with reference to the accompanying drawing figures in which like reference numerals designate like elements and wherein:

FIG. 3 is a view showing the generation of a gear clash, wherein

DETAILED DESCRIPTION OF A PREFERRED EMBODIMENT OF THE INVENTION

Figure 1:
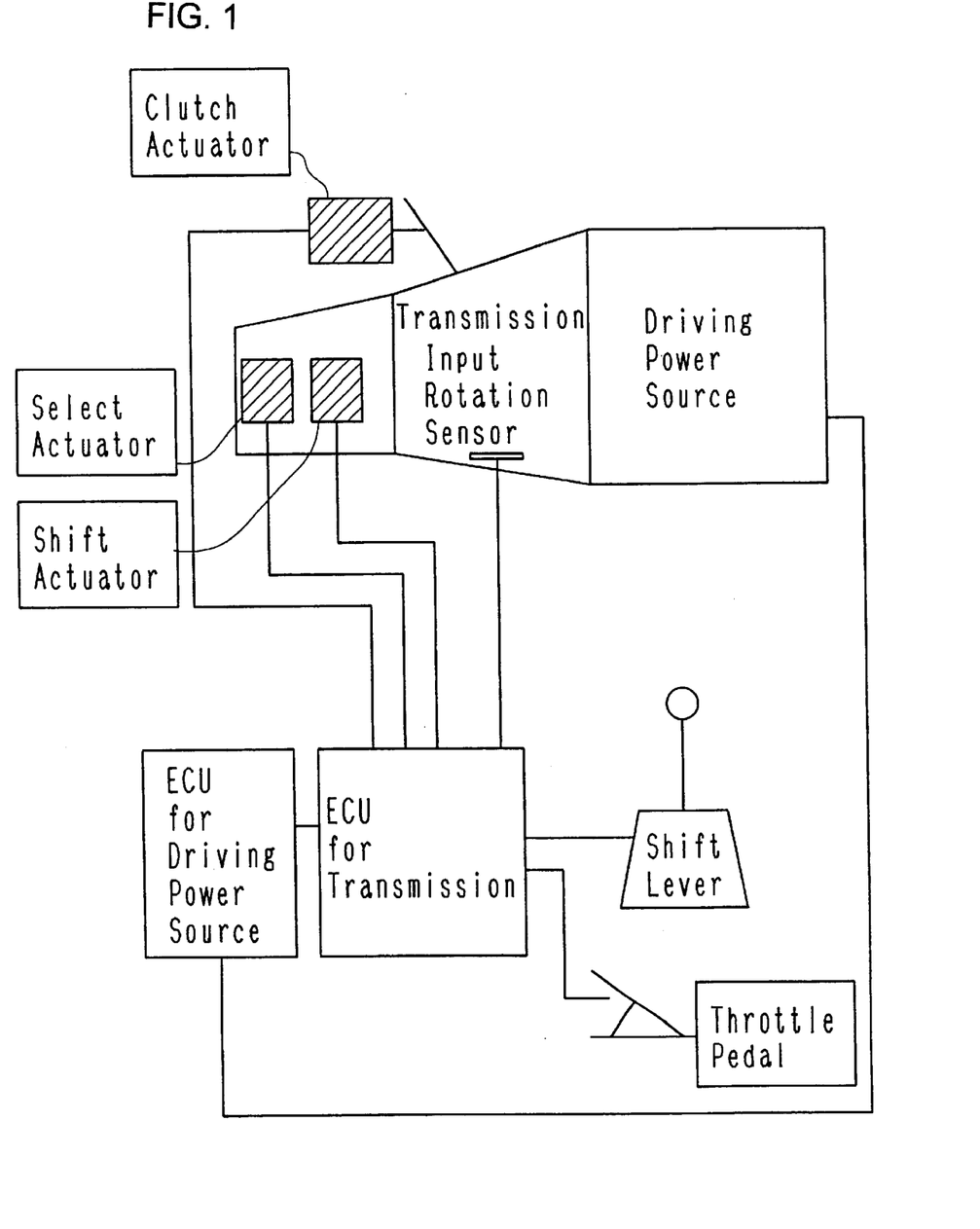
FIG. 1 is a schematic view of an automatic manual transmission system according to an embodiment of the present invention.
Figure 1A:
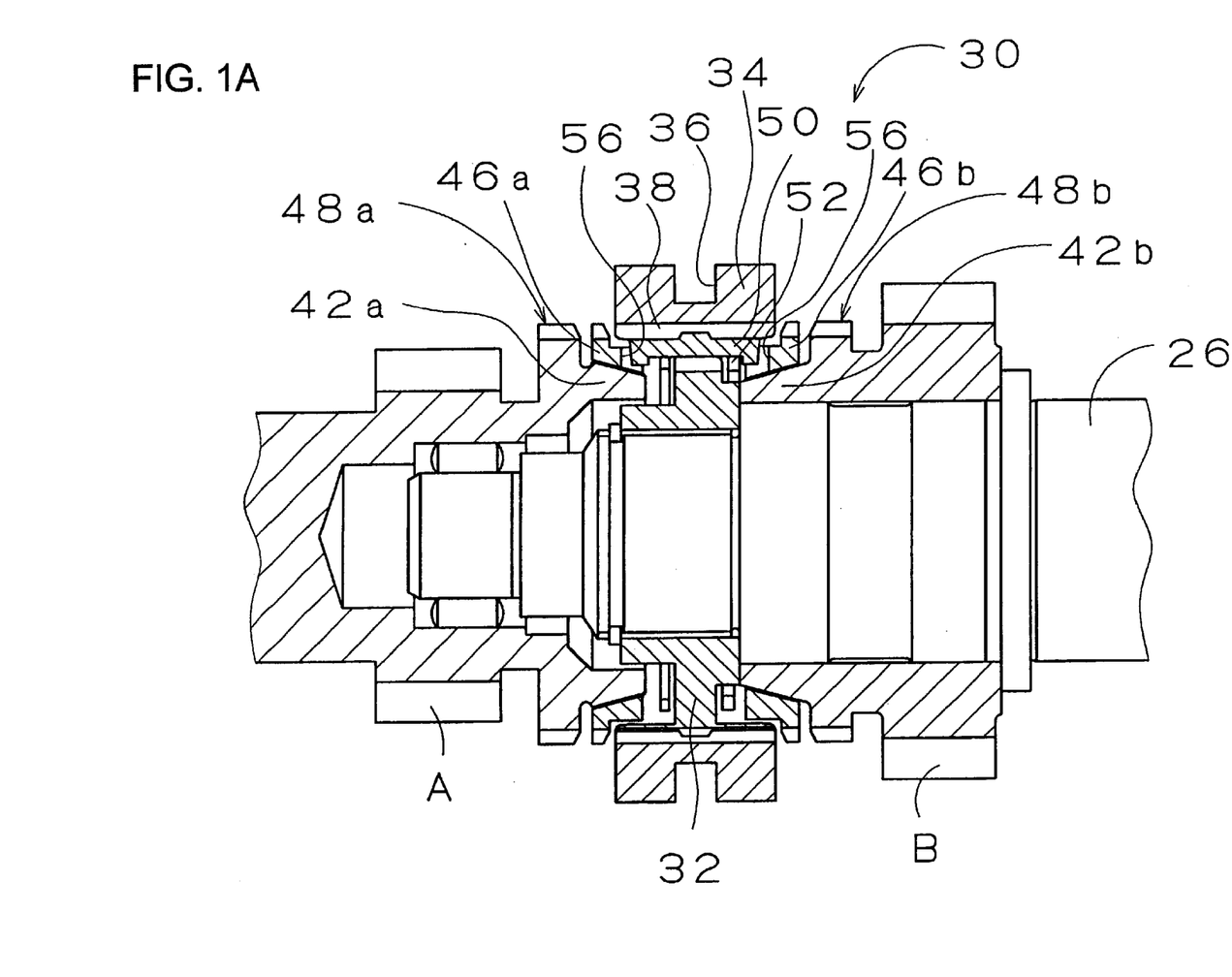
FIG. 1A is a longitudinal sectional view through a synchronizer.

FIG. 1A shows a balking-type Borg Warner synchronizer 30.

The synchronizer 30 includes a clutch hub 32 mounted thereon for rotation therewith (always relatively non-rotatable). On the outer periphery of the clutch hub 32, a sleeve 34 is disposed, and the clutch hub 32 and the sleeve 34 are always rotatable together and movable together in the axial direction. On the outer periphery of the sleeve 34, an annular groove 36 is formed. A shift fork (not shown) is disposed in the groove 36 by holding the sleeve 34 from both sides. The sleeve 34 is moved in the axial direction along with the shift fork but is rotatable relatively to the shift fork. In the inner periphery of the sleeve 34, a plurality of circumferentially spaced clutch teeth 38 are formed to define a first clutch on the sleeve 34.

A gear A and a gear B are relatively rotatably mounted on the output shaft 26 respectively at two axially fixed positions having the sleeve 34 therebetween. The gear A and the gear B function as idling gears and are always intermeshed with respective gears (not shown) fixed to the counter shaft.

On the outer peripheral portion of a shaft portion of the gear A close to the sleeve 34, a cone 42a is formed having a conical surface whose diameter is gradually smaller approaching the sleeve 34. The conical surface of the cone 42a constitutes an example of the frictional surface of the present invention.

The cone 42a carries an axially slidable synchronizer ring 46a having a conical surface supplementing the conical surface of the cone 42a. On the outer periphery of the synchronizer ring 46a, a plurality of circumferentially spaced teeth are formed. The plurality of teeth are selectively intermeshed with the clutch teeth 38 of the sleeve 34.

On the peripheral portion of the shaft portion of the gear A close to the cone 42a, a plurality of teeth 48a are formed to define a second clutch on the gear A. The teeth clutch 48a are selectively intermeshed with the clutch teeth 38 of the sleeve 34.

Between the clutch hub 32 and the sleeve 34, a plurality of circumferentially spaced shifting keys 50 are equipped.

Each shifting key 50 extends in the axial direction of the sleeve 34 with a predetermined width. Each shifting key 50 is always pressed against an inner peripheral surface of the sleeve 34 by a respective key spring 52 positioned between the shifting key 50 and the clutch hub 32. A protrusion or convexity formed on an outer face of each shifting key 50 is disposed in a recess formed on the inner surface of the sleeve 34. When the sleeve 34 is slidably moved in the axial direction and when the protrusion does not ride over a slope of the recess because the spring force pushing the key against the sleeve does not exceed a predetermined value, the sleeve 34 and the shifting key 50 move as one unit. On the other hand, when the protrusion rides over the slope because the aforementioned force exceeds the predetermined value, only the sleeve 34 is moved.

The plurality of shifting keys 50 are always partially inserted into respective concave portions 56 formed in the synchronizer ring 46a. The concave portion 56 extend in the axial direction of the synchronizer ring 46a and are configured so that relative rotation between the sleeve 34 and the synchronizer ring 46a is allowed in a predetermined range. The position of the bottom surface of the concave portion 56 is predetermined to have a clearance between the tip end surface of the corresponding shifting key 50 when the sleeve 34 and the synchronizer ring 46a are at initial position. The clearance is reduced as the shifting key 50 is approaches the synchronizer ring 46a. When the clearance is eliminated, the force of the shifting key 50 in the axial direction is transmitted to the synchronizer ring 46a, and thus the synchronizer ring 46a is pushed up along the cone 42a. By the resulting pressure, the relative rotation between the sleeve 34 and the gear A is reduced.

When the sleeve 34 continues to be moved in the same axial direction after the shifting key 50 contacts the synchronizer ring 46a, only the sleeve 34 moves axially, and thus the tip end surface of the teeth 38 of the sleeve 34 contacts the tip end surface of the teeth of the synchronizer ring 46a. When the relative rotational speed between the sleeve 34 and the gear A is not substantially zero, the clearance in the axial direction between the shifting key 50 and the concave portion 56 is eliminated, and thus the rotation of the synchronizer ring 46a relative to the sleeve 34 is stopped. Accordingly, a further movement of the sleeve 34 in the direction of the synchronizer ring 46a is blocked by the synchronizer ring 46a. That is, the sleeve 34 is balked. Simultaneously, resulting from pressing the synchronizer ring 46a hard along the cone 42a by the sleeve 34, the relative rotational speed between the sleeve 34 and the gear A is reduced to substantially zero.

When that relative rotational speed is substantially zero, that is when the synchronization is completed, hardly any frictional force between the synchronizer 46a and the cone 42a is generated. Thus, the synchronizer ring 46a becomes relatively rotatable to the sleeve 34. Accordingly, the teeth of the sleeve 34 advance into the teeth of the synchronizer ring 46a in the axial direction and thus the teeth of the sleeve 34 and the synchronizer ring 46a are intermeshed. Soon afterward, the clutch teeth 38 of the sleeve 34 are advanced into the teeth clutch 48a of the gear A in the axial direction, and thus the clutch teeth 38 of the sleeve 34 are intermeshed with the clutch teeth 48a of the gear A.

Likewise as the gear A, the gear B is formed with a cone 42b and a clutch 46b. The cone 42b is equipped with a synchronizer ring 46b.

When the clutch teeth 38 of the sleeve 34 are intermeshed with the teeth of the synchronizer ring 46a of the gear A side and the clutch teeth 48a of the gear A, the rotation of the gear A is transmitted to the output shaft 26. Under this condition, a set of gear mates is defined by the gear A and another gear always intermeshed with the gear A and rotating along with the counter shaft. On the contrary, when the clutch teeth 38 of the sleeve 34 are intermeshed with the teeth of the synchronizer ring 46b (adjacent the gear B) side and with the clutch teeth 48b of the gear B, the rotation of the gear B is transmitted to the output shaft 26. Under this condition, another set of gear mates is defined by the gear B and another gear always intermeshed with the gear B and rotating along with the counter shaft. As described in the forgoing, the transmitted rotation to the output shaft 26 is selected from the gear A and the gear B in accordance with the movement of the sleeve 34. As a result, the shift ratio of the transmission is varied.

An embodiment, regarding a gear shifting control device (controller) for an actuator applied in a transmission, according to the present invention will be explained in detail as follows.

1) Gear Clash Judging Means

Shift change advancing information, i.e., gear shifting progress information, relates to an input acceleration based on time differentiation of an input rotation speed. It is favorable that the gear clash judging means judges that the gear clash is generated when an absolute value of the input acceleration is greater than a predetermined reference value.

The gear clash is considered to be caused by an advance of the sleeve before the synchronization is completed. Accordingly, when the gear clash is generated, the input rotation speed is suddenly changed irrespective of up-shift or down-shift. Thus, the gear clash judging means judges that the gear clash is generated when the absolute value of the input acceleration is greater than a predetermined value by comparing the absolute value of the input acceleration (which is the time differentiation of the input rotation speed) with the predetermined value.

In this case, the absolute value of the input acceleration is greater than the predetermined value i.e., greater than a predetermined positive value (i.e. maximum value) when the input acceleration is positive, and smaller than a predetermined negative value (i.e., minimum value) when the input acceleration is negative.

Hence, the comparison can be achieved not only by comparing the absolute value with the predetermined value (i.e. positive number) but also by making the comparison in accordance with a negative or positive input acceleration. A predetermined value in this case is set at each deceleration ratio and each shift change. Further, the input acceleration is easily obtained by differentiating the input rotation speed by the gear shifting control device. Since the presence of the gear clash is judged only based on the input rotation speed, it is very reasonable and easily controlled. This concept is the same as in the case of an output acceleration.

The input rotation speed is detected by an input rotation sensor provided on the input shaft such as the clutch shaft and the counter shaft of the transmission. The gear shifting control device may recognize the input rotation speed by receiving a signal representing the rotation speed of the engine or the driving motor from a gear shifting control device (controller) on the driving power source side.

An inertia mass of the input shaft side is normally smaller than that of the output shaft side to which the inertia mass of the vehicle is added. Thus, the variation of the input acceleration at shift change is large, and can be used as the shift change advancing information for judging the gear clash.

An output acceleration is applicable as the shift change advancing information since an output rotation number varies accompanying to shift change.

Accordingly, the shift change advancing information corresponds to the output acceleration based on the time differentiation of the output rotation speed. The gear clash judging means may judge the generation of the gear clash when an absolute value of the output acceleration is greater than a predetermined value.

The output rotation speed is detected by an output rotation sensor provided on an output shaft such as a main shaft, a propeller shaft, and a drive shaft of the transmission. For example, a rotation speed signal obtained from a rotation speed sensor for a speed meter is applicable.

As the output rotation sensor becomes positioned farther from the synchromesh mechanism, distortion of the output shaft affects the output acceleration. Thus, it is preferable to have the output rotation sensor closer to the synchromesh mechanism.

It is preferable that the shift change advancing information is obtained from a relative rotation speed between the input rotation speed and the output rotation speed and a sleeve physical quantity based on the displacement of the sleeve. It is also preferable that the generation of the gear clash is judged based on the shift change advancing information when the relative rotation speed is greater than a predetermined value and the sleeve physical quantity is greater than a predetermined value.

That is because the gear clash is generated when the sleeve advances under the condition in which the relative rotation speed is greater than the predetermined speed. By taking the displacement of the sleeve into consideration rather than depending only on the input and output rotation speeds as the shift change advancing information, the accuracy of judging the gear clash is improved.

Since the relative rotation speed is the difference between the input rotation speed and the output rotation speed, positive and negative numbers may appear, depending on the way of calculation. The relative rotation speed number can be an absolute value of the input acceleration.

The relative rotation speed may not be zero even after the completion of the synchronization depending on which input rotation is used to provide the input rotation speed and which output rotation is used to provide the output rotation speed unless the rotation numbers are converted as the rotation number on the synchromesh mechanism. Accordingly, when the relative rotation number is applied for judging the gear clash, it is necessary to compare a predetermined value with the relative rotation speed after completion of the synchronization in accordance with the gear shift considering the above conditions.

It is not always necessary to directly detect the output rotation speed. The output rotation speed can be estimated from the input rotation speed without using an output rotation sensor.

It is favorable that the relative rotation speed is the difference between the input rotation speed detected during shift change and the output rotation speed estimated from the input rotation speed detected by the input rotation sensor before the shift change.

The output rotation speed is, for example, estimated by multiplying and dividing a deceleration ratio from a position of the input rotation sensor to a standardized output shaft to the input rotation number detected at the gear shift before the shift change. That is to say, basically, the output rotation speed is estimated by multiplying the input rotation speed by the deceleration ratio or by dividing the input rotation speed by the deceleration ratio. The input rotation speed is detected at the gear shift before the shift change and the deceleration ratio is determined to be from a position of the input rotation sensor to a standard output shaft. Although related to the setting of the predetermined value for judging the gear clash, the predetermined value for comparison is easily set when it is estimated that the difference between the input rotation and the output rotation becomes zero after the completion of the synchronization.

The sleeve physical quantity represents an advanced condition of the sleeve based on the displacement. For example, the sleeve physical quantity may be: the position, or the displacement, or the speed or the acceleration of the sleeve. The speed and the acceleration are easily obtained by differentiating the displacement.

The sleeve physical quantity may be detected at anytime during the synchronization. For example, the sleeve physical quantity at an initial phase of the synchronization and the sleeve physical quantity on the way of the synchronization are adopted. Further, whether the sleeve physical quantity is greater than a predetermined value is judged by whether the sleeve reaches a predetermined position, that is, for example, a spline engagement completion position between the sleeve and the idling gear.

The sleeve displacement, which is a basis of the sleeve physical quantity, is detected, for example, by using a displacement sensor such as a slider in which the electrical resistance value is varied depending on the position. Regarding the synchromesh transmission, it is not easy to detect the sleeve displacement by measuring the actual sleeve movement amount considering that there are plurality of sleeves and that the sleeves are rotational bodies in a hydraulic ambient medium.

Thus, it is preferable to provide the displacement sensor at a position on a shift link mechanism between a shift lever or one of shift actuators and a shift fork. It is preferable to estimate the sleeve physical quantity based on the displacement detected from the displacement sensor.

Accordingly, it is preferable that the sleeve physical quantity is estimated based on the displacement detected from the shift link mechanism. The detected displacement may be linear displacement or turning angle displacement of an element such as a shift lever.

Further, it is more preferable that the estimated sleeve physical quantity corresponds to a corrected value of displacement difference between a detected displacement by the displacement sensor and an actual displacement of the sleeve. The displacement difference may be generated by various deflections or distortions on the shift link.

2) Gear Clash Shift Change Recognizing Means

It is preferable that the gear shifting control device according to the synchromesh transmission of the present invention includes a gear clash shift change recognizing means for recognizing that a particular gear shift mode (e.g., a shift mode going from the first gear ratio to the second gear ratio) constitutes a "gear clash shift mode", i.e., a mode which is chronically susceptible to gear clashes.

When a gear clash shift mode is recognized as such by the gear clash shift change recognizing means, the gear shifting control device becomes capable of shift change control for avoiding the gear clash, i.e. that particular gear shift mode can be skipped.

It is more favorable for the gear clash shift change recognizing means to recognize a gear shift mode as being a gear clash shift mode when it is judged by the gear clash judging means that the gear clash is generated more frequently than a predetermined value for that particular shift mode.

A generated gear clash does not always occur consecutively at a specific gear shifting. That is, the gear clash may be an isolated accidental occurrence. Accordingly, by judging a gear shift mode as being a gear clash shift mode only when it has been judged that gear clashes have been generated more frequently than the predetermined value, the accuracy of the judgment is further improved.

For example, a particular shift mode could be recognized as a gear clash shift mode if the gear clashes occur repeatedly more than twice in succession, or if several gear clashes (e.g., three) occur during a trial judging of a predetermined number of shifts (e.g., ten shifts).

3) Gear Shift Skipping Means

It is favorable that the gear shifting control device according to the synchromesh transmission of the present invention includes a gear shift skipping means for conducting shifting control by skipping the "gear clash shift mode," i.e. the mode determined as being susceptible to gear clashes.

The durability of the transmission declines, and the driver is given an unpleasant feeling when gear clashes continuously occur. In this case, by conducting a shifting control wherein the gear clash shift mode is skipped, the reliability of the transmission is improved and the driver is not given an unpleasant feeling.

4) Other Features

The foregoing shift change advancing information based on the rotation speed and the sleeve physical quantity can be combined whereby the judging accuracy is improved.

It is preferable that the judgment of the generation of a gear clash by the gear clash judging means, and the recognition of a gear clash shift mode by the gear clash shift change recognizing means are reported to the driver by turning on a warning lamp on the instrument panel or by indicating the gear clash shift mode on a liquid crystal display. Then, the driver can arrange for repairs.

An embodiment of the gear shifting control device according to the synchromesh transmission will be explained as follows.

As shown in FIG. 1, an automatic manual transmission system has an engine 1 (or a driving motor) as a driving source. A driving force from the driving power source is transmitted to the synchromesh transmission 2 (hereinafter called transmission). The driving force from the transmission is transmitted to a clutch shaft (not shown) provided on the transmission via intermittently operable dry type clutch. The driving input is transmitted via a clutch shaft, a main drive gear, a counter shaft, a counter gear, the idling gear B, the sleeve 34, and the synchronizer ring 46a, to a main shaft. The driving input becomes a driving output under a predetermined deceleration ratio.

The automatic manual transmission system includes a clutch actuator 3 for connecting and disconnecting the dry type clutch, a select actuator 4 for selecting the sleeve in accordance with the gear shift, a shift actuator 5 for sliding the selected sleeve, and an Electronic Control Unit 6 for transmission (ECU for transmission) for conducting shifting control. The ECU for transmission is a main body of the gear shifting control device of the present invention.

The ECU for transmission is inputted with signals. An input rotation speed signal is inputted from an input rotation sensor to the ECU for the transmission. A gear shift signal is inputted from a shift lever 7 or a steering switch to the ECU transmission. A pedal signal regarding the pedal depression amount, or whether the pedal depression is operated, is inputted from a pedal sensor provided on a throttle pedal or brake pedal. The ECU for transmission 6 exchanges the shift change information and the driving source information with an ECU for driving source 8. According to the automatic manual transmission system, complete automatic shift change can be achieved based on the vehicle speed and the degree of throttle opening in addition to manual shifting.

A gear clash judging means, a gear clash shift change recognizing means, and a gear shift skipping means are structured with the ECU for transmission. That is, the gear clash judging means, the gear clash shift change recognizing means, and the gear shift skipping mean are formed with a CPU, a RAM, a ROM, and an interface connected to an I/O port in the ECU for transmission and the control thereof is transacted by a program.

In this embodiment, the gear clash judgment is conducted by comparing an input acceleration obtained by differentiation based on an input rotation speed signal to a predetermined reference value (e.g., 100 rpm/msec). Thus, a gear clash judging means of the embodiment is structured with an input interface for receiving the input rotation speed signal, and the gear shift signal and a CPU for calculating based on those signal, that is data.

A "gear clash shift mode" is recognized as such in the following manner. First, the judgment by the gear clash judging means is memorized in a memory such as RAM relating to the gear shift information. Whether a gear clash has been generated is judged each time when a particular gear shift mode is selected, and the judged gear clashes are counted. When it is judged that more than three gear clashes have been generated in a trial judgment of ten successive shifts, that shift mode is recognized as being a gear clash shift mode. This result is memorized in a non-volatile memory of the gear shift skipping control. By memorizing those results in the non-volatile memory, data relating to gear clash gear shifts is saved irrespective of starting and stopping of the vehicle.

Accordingly, the gear clash shift change recognizing means includes: (i) a memory for memorizing judgments of the gear clash judging means, (ii) a CPU for counting the number of judged gear clashes from the memory data for whether recognizing whether the particular shift mode is a gear clash shift mode, and (iii) a non-volatile memory for flagging when a shift mode is a gear clash shift mode.

Figure 2:
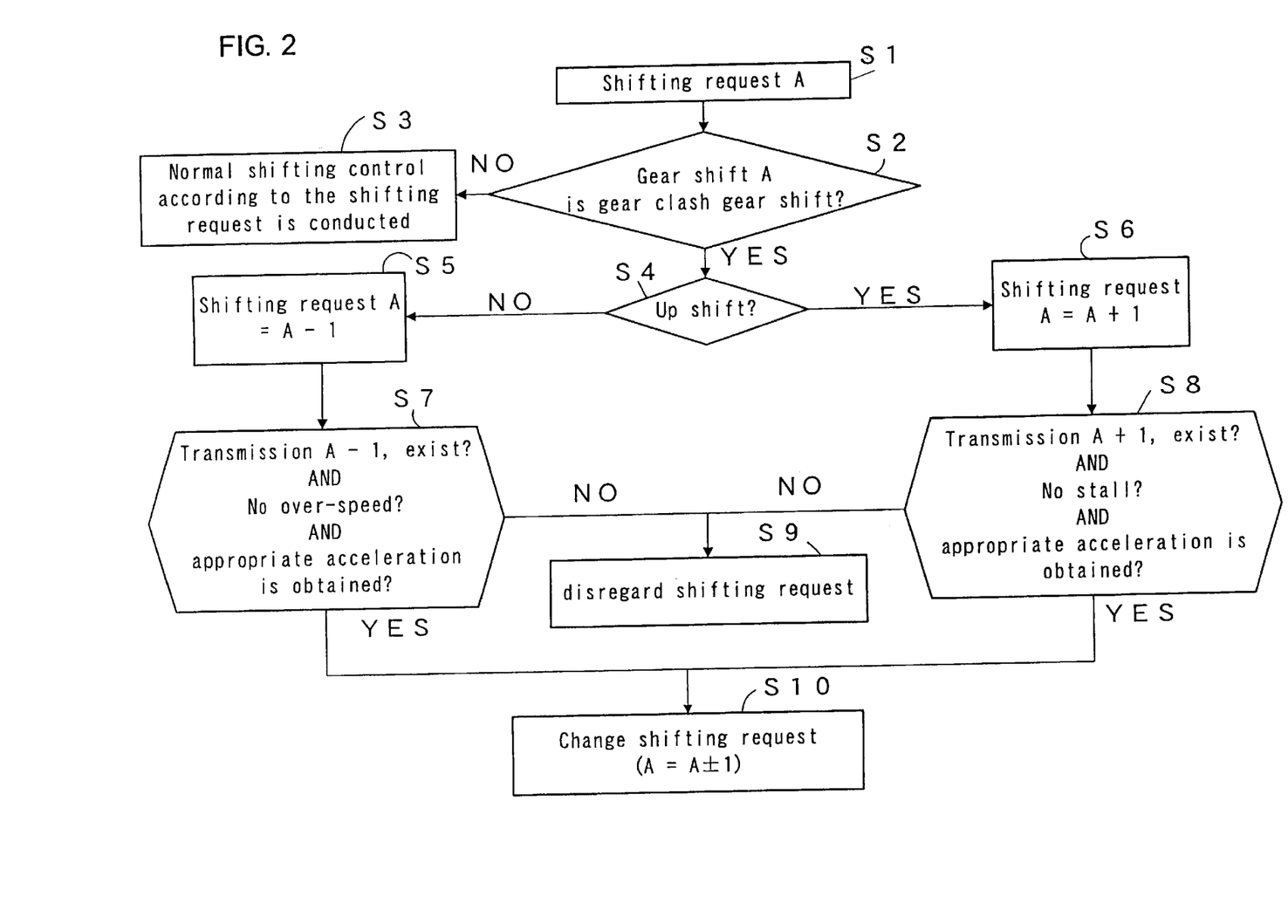
FIG. 2 is a flowchart showing an example of transaction by gear shift skipping means according to the embodiment of the present invention.

The gear shift skipping control is transacted according to a flowchart shown in FIG. 2. When a gear shift mode A is requested in step S1, whether a gear clash occurs is judged in step S2. When the shift mode A is not a gear clash shift mode, a normal shifting control is conducted following the shifting request in step S3. On the other hand, when the shift mode A is a gear clash shift mode, a step is advanced to step S4 to judge whether the shift mode is an up-shift or a down-shift.

If the shift mode was for a down-shift, the shifting request is tentatively changed to a gear shift mode A−1 in step S5. In step S7, it is judged whether the gear shift A−1 is appropriate. That is, it is judged whether the shift mode A−1 exists, whether the engine will not over-speed, and whether an appropriate acceleration torque can be obtained when the gear shift is changed to the gear shift mode A−1. When all conditions are satisfied, a step is advanced to step S10 to change the shifting request for gear shift mode A to a shifting request for gear shift mode A−1.

However, when one of the conditions not satisfied, then no shifting either to the gear shift mode A or to the gear shift mode A−1 is conducted, the shifting request in step S1 is disregarded, and the gear shift mode before the shifting request, that is a current shift mode (e.g., A+1) is maintained in step S9.

On the other hand, when the shifting request is for up-shift, the shifting request is tentatively changed to the shift mode A+1 in step S6. In step S8, it is judged whether the shift mode A+1 is appropriate. That is, it is judged whether the shift mode A+1 exists, whether the engine will not stall, and whether an appropriate acceleration torque can be obtained when the gear shift mode is changed to the gear shift mode A+1. When all conditions are satisfied, step is advanced to step S10 to change the shifting request for the gear shift mode A to a shifting request for the gear shift mode A+1.

However, when one of the conditions is not satisfied, then no shifting either to the shift mode A or to the shift mode A+1 is conducted, the shifting request in step S1 is disregarded, and the shift mode before the shifting request, that is a current gear shift (e.g., A−1) is maintained in step S9.

Accordingly, the gear shift skipping means of this embodiment includes: (i) an interface for receiving the input rotation speed signal and the gear shift signal, (ii) a ROM for memorizing each shifting conditions, and (iii) a CPU for judging whether the shift in a request needs to be changed, on the basis of available data.

Although the gear clash judgment is conducted based on the input acceleration in this embodiment, it is not limited to the input acceleration; the gear clash judgment can be conducted based on foregoing various shift change advancing information.

The gear shift skipping control can be achieved not only when the driver requests the shifting request, but also when the gear shifting control device conducts complete automatic manual transmission. That is, it is preferable that the gear shifting control device judges whether the gear shift mode that is to be automatically shifted is a gear clash shift mode and thus conducts the shifting control by selecting an appropriate shift mode.

According to a gear shifting control device of a synchromesh transmission of the embodiment of the present invention, the gear clash judging means easily judges whether a gear shift generates a gear clash even when the actuator conducts a shift change.

The principles, preferred embodiments and modes of operation of the present invention have been described in the foregoing specification. However, the present invention which is intended to be protected is not to be construed as limited to the particular embodiment disclosed. Further, the embodiment described herein is to be regarded as illustrative rather than restrictive. Variations and changes may be made by others, and equivalents employed without departing from the spirit of the present invention. Accordingly, it is expressly intended that all such variations, changes and equivalents which fall within the spirit and scope of the present invention as defined in the claims, be embraced thereby.

What is claimed is:

1. A gear shifting control device for a synchromesh transmission including input and output shafts, comprising:
    a synchromesh mechanism having a movable sleeve for achieving a predetermined gear shifting by synchronization between rotating gears of input and output shafts of the transmission;
    an actuator for selectively moving the sleeve toward meshing engagement with a relatively rotating one of the gears to effect a gear shifting; and
    a gear clash judging means for judging whether a gear clash is generated during the gear shifting on the basis of gear shifting progress information indicating the state of progress of the gear shifting.

2. The gear shifting control device according to claim 1, wherein the gear shifting progress information corresponds to an input acceleration based on time differentiation of an input shaft rotation speed; the gear clash judging means being operable for judging that a gear clash has been generated when an absolute value of the input acceleration is greater than a predetermined reference value.

3. The gear shifting control device according to claim 1, wherein the gear shifting progress information corresponds to an output acceleration based on time differentiation of an output shaft rotation speed; the gear clash judging means being operable for judging that a gear clash has been generated when an absolute value of the output acceleration is greater than a predetermined reference value.

4. The gear shifting control device according to claim 1, wherein the gear shifting progress information includes a relative rotation speed value based upon a relationship between an input shaft rotation speed and an output shaft rotation speed, and a sleeve physical quantity based on displacement of the sleeve; the gear clash judging means being operable for judging that a gear clash has been generated when the relative rotation speed value is greater than a predetermined reference value and the sleeve physical value is greater than a predetermined reference value.

5. The gear shifting control device according to claim 1 further comprising a gear clash recognizing means operably connected to the gear clash judging means for recognizing that a particular gear shift mode constitutes a gear clash shift mode that is susceptible to gear clashes.

6. A method of controlling the gear shifting of a vehicle comprising the steps of:
   A) actuating a movable sleeve of a synchromesh mechanism for effecting a synchronization between input and output shafts during a gear shifting operation;
   B) judging whether a gear clash occurs during each gear shifting operation;
   C) determining whether gear clashes occur in a particular gear shift mode more frequently than a reference value; and
   D) skipping a gear shift mode once the frequency of gear clashes therein exceeds the reference value.

7. A gear shifting control device for a synchromesh transmission including input and output shafts, comprising:
   a synchromesh mechanism having a movable sleeve for achieving a predetermined gear shifting by synchronization between the input and output shafts;
   an actuator for moving the sleeve to effect a gear shifting; and
   a gear clash judging means for judging whether a gear clash is generated during a gear shifting on the basis of gear shifting progress information indicating the state of progress of the gear shifting;
   wherein the gear shifting progress information corresponds to an input acceleration based on time differentiation of an input shaft rotation speed; the gear clash judging means being operable for judging that a gear clash has been generated when an absolute value of the input acceleration is greater than a predetermined reference value.

8. A gear shifting control device for a synchromesh transmission including input and output shafts, comprising:
   a synchromesh mechanism having a movable sleeve for achieving a predetermined gear shifting by synchronization between the input and output shafts;
   an actuator for moving the sleeve to effect a gear shifting; and
   a gear clash judging means for judging whether a gear clash is generated during a gear shifting on the basis of gear shifting progress information indicating the state of progress of the gear shifting;
   wherein the gear shifting progress information corresponds to an output acceleration based on time differentiation of an output shaft rotation speed; the gear clash judging means being operable for judging that a gear clash has been generated when an absolute value of the output acceleration is greater than a predetermined reference value.

9. A gear shifting control device for a synchromesh transmission including input and output shafts, comprising:
   a synchromesh mechanism having a movable sleeve for achieving a predetermined gear shifting by synchronization between the input and output shafts;
   an actuator for moving the sleeve to effect a gear shifting; and
   a gear clash judging means for judging whether a gear clash is generated during a gear shifting on the basis of gear shifting progress information indicating the state of progress of the gear shifting;
   wherein the gear shifting progress information includes a relative rotation speed value based upon a relationship between an input shaft rotation speed and an output shaft rotation speed, and a sleeve physical quantity based on displacement of the sleeve; the gear clash judging means being operable for judging that a gear clash has been generated when the relative rotation speed value is greater than a predetermined reference value and the sleeve physical value is greater than a predetermined reference value.

10. The gear shifting control device according to claim 9, further including an input rotation sensor for detecting the input shaft rotation speed.

11. The gear shifting control device according to claim 9, wherein the relative rotation speed value corresponds to a difference between the input shaft rotation speed detected by an input rotation sensor, and the output shaft rotation speed estimated from the input shaft rotation speed detected by the input rotation sensor prior to a gear shift.

12. The gear shifting control device according to claim 9, wherein the sleeve physical quantity is defined on the basis of one of: a sleeve position, a sleeve displacement amount, a sleeve speed, and a sleeve acceleration.

13. The gear shifting control device according to claim 9, wherein the sleeve physical quantity is defined on the basis of a displacement detected in a shift link mechanism operatively connected to the sleeve.

14. The gear shifting control device according to claim 9, wherein the shift link mechanism comprises shifting means for effecting a shift change of the synchromesh transmission and a shift fork operatively connected with the sleeve.

15. A gear shifting control device for a synchromesh transmission including input and output shafts, comprising:
   a synchromesh mechanism having a movable sleeve for achieving a predetermined gear shifting by synchronization between the input and output shafts;
   an actuator for moving the sleeve to effect a gear shifting;
   a gear clash judging means for judging whether a gear clash is generated during a gear shifting on the basis of gear shifting progress information indicating the state of progress of the gear shifting; and
   a gear clash recognizing means operably connected to the gear clash judging means for recognizing that a particular gear shift mode constitutes a gear clash shift mode that is susceptible to gear clashes,
   wherein the gear clash recognizing means is operable to recognize that a particular gear shift mode constitutes a gear clash shift mode by determining a number of gear clashes occurring during that operation of that particular shift mode and comparing the determined number of gear clashes to a reference value.

16. The gear shifting control device according to claim 15 further comprising a gear shift skipping means for conducting shifting control by skipping the gear clash shift mode.

17. The gear shifting control device according to claim 15, further comprising a gear shift skipping means operably connected to the gear clash recognizing means for conducting a shifting control by skipping the gear clash shift mode.

* * * * *